United States Patent [19]

Hayashi et al.

[11] Patent Number: 4,943,542
[45] Date of Patent: Jul. 24, 1990

[54] PROCESS FOR PRODUCING SILICA GLASS

[75] Inventors: Fusashi Hayashi; Kooichi Takei; Yooichi Matii; Toshikatsu Simazaki, all of Tsukuba; Akihito Imai; Takao Nakada, both of Hitachi, all of Japan

[73] Assignee: Hitachi Chemical Company, Ltd., Tokyo, Japan

[21] Appl. No.: 262,803

[22] Filed: Oct. 26, 1988

[30] Foreign Application Priority Data

Oct. 31, 1987 [JP] Japan ................................ 62-276455
Oct. 31, 1987 [JP] Japan ................................ 62-276457
Oct. 31, 1987 [JP] Japan ................................ 62-276459
Nov. 20, 1987 [JP] Japan ................................ 62-294459

[51] Int. Cl.$^5$ .............................................. C03C 3/06
[52] U.S. Cl. ...................................... 501/12; 501/54
[58] Field of Search ................................... 501/12, 54

[56] References Cited

FOREIGN PATENT DOCUMENTS 62-123032 6/1987 Japan .
62-265130 11/1987 Japan .

Primary Examiner—Mark L. Bell
Assistant Examiner—Deborah Jones
Attorney, Agent, or Firm—Antonelli, Terry, Stout & Kraus

[57] ABSTRACT

A silica glass excellent in optical properties can be produced by a sol-gel process without generating cracks and fractures by adding to a hydrolysis system at least before gelation (A) an organic polymer such as a polyalkylene glycol, etc. and/or (B) an organic solvent such as N,N-dimethylacetamide, etc.

13 Claims, No Drawings

PROCESS FOR PRODUCING SILICA GLASS

BACKGROUND OF THE INVENTION

This invention relates to a process for producing a silica glass usable for optics, semiconductor industry, electronic industry, physical and chemical applicances, etc.

Silica glass is an inevitably important material for producing semiconductors due to its excellent heat resistance, corrosion resistance and optical properties. Further, the silica glass is also used as optical fibers, photo mask substrates for producing IC, TFT substrates and is broadening it utility more and more.

The silica glass has been produced by a method wherein natural quartz is melted in an electric furnace or by an oxyhydrogen flame, or a method wherein silicon tetrachloride is subjected to high-temperature oxidation and melted in an oxyhydrogen flame or a plasma flame. But these methods have many problems in economy and quality in that a large amount of energy is consumed in the production processes because of necessitating a high temperature of 2000° C. or higher, it is necessary to use a material durable at such a high temperature in the production processes, a highly pure product is difficult to be obtained, and the like.

Recently, there has been noticed a sol-gel process wherein a silica glass is synthesized at low temperatures. According to the sol-gel process, the silica glass is produced by adding water to a silicon alkoxide represented by the formula:

$$Si(OR)_4$$

wherein R is an alkyl group, and/or a silicon alkoxide polycondensate represented by the formula:

$$(RO)_3Si\text{-}[OSi(OR)_2]_n\text{-}OSi(OR)_3$$

wherein R is an alkyl group; and n is zero or an integer of 1 to 8, (if necessary, a pH can be adjusted with an alkali or acid), carrying out hydrolysis to give a silica hydrosol (hereinafter referred to as "silica sol") while adding an solvent such as an alcohol so as to make a uniform system of the silicon alkoxide and water, allowing the silica sol to stand, followed by a temperature rise, to carry out gelation by addition of a gelatinizer, evaporating and drying the resulting gel to give a dry gel, and sintering the dry gel in a suitable atmosphere.

But there are still unsolved problems in the production of silica glass by the sol-gel process. For example, in the course of drying the gel, cracks and fractures are easily produced on the gel. Thus, it is very difficult to produce a large-sized monolithic dry gel without cracks and fractures in good yield.

In order to prevent cracks and fractures of the gel, it is proposed to add formamide at the hydrolysis of silicon alkoxide (Mat. Res. Soc. Symp. Proc., 32, (1984), 47–52) or to add a solvent having a higher boiling point than water such as 1-butanol, 1-pentanol, 1-hexanol, or toluene (Japanese Patent Unexamined Publication No. 61-183129). But the prevention of cracks and fractures are still insufficient. It is also proposed to add a fine powder of silica at the hydrolysis of silicon alkoxide (U.S. Pat. No. 4,681,615). According to this method, cracks and fractures of the gel can be prevented, but fine powder of silica is readily retained not sintered, which results in readily lowering optical properties, particularly light transmittance, of the obtained glass.

SUMMARY OF THE INVENTION

It is an object of the present invention to provide a process for producing a silica glass excellent in optical properties without generating cracks and fractures.

The present invention provides a process for producing a silica glass which comprises
hydrolyzing at least one member selected from the group consisting of a silicon alkoxide of the formula:

$$Si(OR)_4$$

wherein R is an alkyl group, and a silicon alkoxide polycondensate of the formula:

$$(RO)_3Si\text{-}[OSi(OR)_2]_n\text{-}OSi(OR)_3$$

wherein R is an alkyl group; and n is zero or an integer of 1 to 8, to give a silica sol,
gelating the silica sol to give a silica gel,
drying the silica gel to give a dry gel, and
sintering the dry gel,
at least before the gelation, there being added to a hydrolyzing system at least one member selected from the group consisting of the following groups (A) and (B):

(A) polyethylene glycols, polyethylene glycol ethers, hydroxyalkyl celluloses, and polyvinyl acetates, and (B) N,N-dimethylacetamide, 1-methyl-2-pyrrolidone, morpholine, N-ethymorpholine, furfuryl alcohol, tetrahydrofurfuryl alcohol, 2-ethoxyethanol, 2-methoxyethanol, 2-isopropoxyethanol, 2-butoxyethanol, diacetone alcohol, ethylene glycol methyl ether, ethylene glycol diethyl ether, diethylene glycol monomethyl ether, diethylene glycol monoethyl ether, diethylene glycol monopropyl ether, diethylene glycol monobutyl ether, diethylene glycol dimethyl ether, and diethylene glycol diethyl ether.

DESCRIPTION OF THE PREFERRED EMBODIMENTS

The process of the present invention is characterized by adding at least before gelation, preferably during the hydrolysis, or after the hydrolysis but before the gelation, at least one compound selected from the groups (A) and (B) to a hydrolyzing system comprising a silicon alkoxide of the formula:
alkyl group preferably having 1 to 4 carbon atoms, and/or a silicon alkoxide polycondensate of the formula:

$$Si(OR)_4 \quad (I)$$

wherein R is an alkyl group preferably having 1 to 4 carbon atoms, and/or a silicon alkoxide polycondensate of the formula:

$$(RO)_3Si\text{-}[OSi(OR)_2]_n\text{-}OSi(OR)_3 \quad (II)$$

wherein R is as defined above; and n is zero or an integer of 1 to 8, and water.

The compounds to be added to the hydrolyzing system and belonging to the group (A) include polyethylene glycols, polyethylene glycol ethers, hydroxyalkyl celluloses and polyvinyl acetates. These compounds can be used alone or as a mixture thereof.

The molecular weight (weight-average molecular weight) of polyethylene glycols and polyethylene glycol ethers is preferably 100 to 60,000, more preferably 1,500 to 50,000, most preferably 3,000 to 40,000. These may be used alone or as a mixture thereof. When the molecular weight of the polyethylene glycol, etc. is less than 100, it is necessary to add in a considerably large amount so as to obtain effective results, which results in showing a tendency to readily generate cracks and fractures in the sintering step of the gel. On the other hand, when the molecular weight is more than 60,000, there is a tendency to make it difficult to obtain uniform gel due to too accelerated gelation.

The amount of polyethylene glycol and polyethylene glycol ether to be added is selected depending on the molecular weight of the polyethylene glycol and polyethylene glycol ethers, and usually 0.1 to 50 parts by weight per 100 parts by weight of the silicon alkoxide of the formula (I) and/or silicon alkoxide polycondensate of the formula (II) used. When the amount is less than 0.1 part by weight, the effect is too little, whereas when the amount is more than 50 parts by weight, there is a tendency to make it difficult to obtain uniform gel due to too accelerated gelation. The larger the molecular weight of the polyethylene glycol and polyethylene glycol ether becomes, the gelation of the sol to the gel is accelerated. When the molecular weight is 40,000 or more, it is preferable to add 20 parts by weight or less.

Examples of the polyethylene glycol ethers are monoethers and diethers such as polyethylene glycol methyl ether, polyethylene glycol ethyl ether, polyethylene glycol propyl ether, polyethylene glycol butyl ether, etc.

Examples of the hydroxyalkyl cellulose are hydroxymethyl cellulose, hydroxyethyl cellulose, hydroxypropyl cellulose, hydroxybutyl cellulose, hydroxybutyl methyl cellulose, etc.

The molecular weight of the hydroxyalkyl cellulose is preferably 100 to 10,000 cps in terms of the viscosity of a 2% aqueous solution measured at 20° C., more preferably 500 to 8000 cps, most preferably 1000 to 6000 cps. These may be used alone or as a mixture thereof. When the molecular weight in terms of the 2% aqueous solution viscosity at 20° C. is less than 100 cps, it is necessary to add in a considerably large amount so as to obtain effective results, which results in showing a tendency to readily generate cracks and fractures in the sintering step of the gel. On the other hand, when the molecular weight in terms of the 2% aqueous solution viscosity at 20° C. is more than 10,000 cps, there is not only a tendency to make it difficult to obtain uniform gel due to too accelerated gelation, but also easily produced large voids in the gel due to decomposition and combustion of high molecular weight hydroxyalkyl cellulose, which has been deposited in the gel during the drying step, in the gel during the sintering step, which results in retaining defects in the produced glass.

The amount of the hydroxyalkyl cellulose to be added is selected depending on the molecular weight of the hydroxyalkyl cellulose, and usually 0.1 to 20 parts by weight, preferably 0.1 to 10 parts by weight, per 100 parts by weight of the silicon alkoxide of the formula (I) and/or the silicon alkoxide polycondensate of the formula (II) used. When the amount is less than 0.1 part by weight, the effect is too little, whereas when the amount is more than 20 parts by weight, there is a tendency to make it difficult to obtain uniform gel due to too accelerated gelation. As the molecular weight of hydroxyalkyl cellulose becomes larger, the gelation of the sol is accelerated. When the 2% aqueous solution has a viscosity of 5000 cps or more at 20° C., it is preferable to add 5 parts by weight or less.

In the case of the polyvinyl acetates, the molecular weight (weight-average molecular weight) is preferably 100 to 250,000. When the molecular weight is less than 100, it is necessary to add in a considerably large amount so as to obtain effective results, which results in showing a tendency to readily generate cracks and fractures in the sintering step of the gel. On the other hand, when the molecular weight is more than 250,000, there is a tendency to make it difficult to obtain uniform gel due to too accelerated gelation.

The amount of the polyvinyl acetate to be added is preferably 0.1 to 100 parts by weight per 100 parts by weight of the silicon alkoxide of the formula (I) and/or the silicon alkoxide polycondensate of the formula (II) used. When the amount is less than 0.1 part by weight, the effect is too little, whereas when the amount is larger than 100 parts by weight, there is a tendency to make it difficult to obtain uniform gel due to too accelerated gelation.

In the hydrolysis of the silicon alkoxide of the formula (I) and/or the polycondensate thereof of the formula (II) by the addition of water or a mixed solution of water and an alcohol to produce a silica sol, it is preferable to previously add to water, alcohol or the mixed solution of water and alcohol, a polyethylene glycol, polyethylene glycol ether or hydroxyalkyl cellulose for uniform dissolution. Since the polyvinyl acetate is insoluble in water, it is added to ethanol to be dissolved uniformly, followed by addition of water to give a mixed solution.

In the step of preparation of a silica sol by hydrolysis of the silicon alkoxide of the formula (I) and/or polycondensate thereof of the formula (II), it is possible to add a monomer or oligomer of vinyl acetate to a system containing a silicon alkoxide (I) and/or polycondensate thereof (II) and water, followed polymerization to produce polyvinyl acetate in the gelation step and/or drying step, in place of simple addition of polyvinyl acetate to a system containing a silicon alkoxide (I) and/or polycondensate thereof (II) and water (more concretely, polyvinyl acetate is dissolved in an organic solvent such as ethanol, and water is added to the resulting solution to give a mixed solution, to which a silicon alkoxide (I) and/or polycondensate thereof (II) are added). In this case, polymerization operation of the monomer or oligomer added to the sol solution is inserted during the gelation step and the successive drying step.

The polymerization operation can be carried out by (1) addition of polymerization initiator to the system at the time of adding the monomer or oligomer; (2) heating, (3) irradiation with light, (4) irradiation with radiation other than light, etc.

The molecular weight of the resulting polyvinyl acetate is controlled so as to form a polymer which can bear stress generated during the drying step. The molecular weight (weight-average molecular weight) is preferably 100 to 250,000.

The compounds to be added to the hydrolyzing system and belonging to the group (B) include N,N-dimethylacetamide, 1-methyl-2-pyrrolidone, morpholine, N-ethylmorpholine, furfuryl alcohol, tetrahydrofurfuryl alcohol, various materials marketed under the trade name Cellosolves which include 2-ethoxyethanol, 2- methoxyethanol, 2-isopropoxyethanol, 2-butoxyethanol, etc., diacetone alcohol, ethylene glycol dimethyl ether, ethylene glycol diethyl ether, diethylene glycol monomethyl ether, diethylene glycol monoethyl ether, diethylene glycol monopropyl ether, diethylene glycol monobutyl ether, diethylene glycol dimethyl ether, diethylene glycol dimethyl ether, and diethylene glycol diethyl ether. These compounds can be used alone or as a mixture thereof.

These compounds can be used in an amount of preferably 1 to 500 parts by weight, more preferably 3 to 200 parts, most preferably 5 to 100 parts by weight per 100 parts by weight of the silicon alkoxide of the formula (I) and/or polycondensate thereof of the formula (II) used.

It is more preferable to add at least one compound selected from the group (A) and at least one compound selected from the group (B) to a system comprising a silicon alkoxide (I) and/or a silicon alkoxide polycondensate (II) and water at least before gelation, usually in the hydrolysis step for forming a silica sol so as to effectively prevent a gel from the generation of cracks and fractures in the drying step of the gel. In such a case, preferable combinations are as follows:

A combination of a polyethylene glycol and/or a polyethylene glycol ether and at least one member selected from the group consisting of N,N-dimethylacetamide, Cellosolves such as 2-ethoxyethanol, 2-methoxyethanol, 2-isopropoxyethanol, 2-butoxyethanol, etc., ethylene glycol dimethyl ether, ethylene glycol diethyl ether, diethylene glycol monomethyl ether, diethylene glycol monoethyl ether, diethylene glycol monopropyl ether, diethylene glycol monobutyl ether, diethylene glycol dimethyl ether, diethylene glycol diethyl ether and tetrahydrofurfuryl alcohol.

A combination of a hydroxyalkyl cellulose and at least one member selected from the group consisting of morpholine, N-ethylmorpholine, 1-methyl-2-pyrrolidone, tetrahydrofurfuryl alcohol, N,N-dimethyl acetamide, Cellosolves such as 2-ethoxyethanol, 2-methoxyethanol, 2-isopropoxyethanol, 2-butoxyethanol, etc., ethylene glycol dimethyl ether, ethylene glycol diethyl ether, diethylene glycol monomethyl ether, diethylene glycol monoethyl ether, diethylene glycol monopropyl ether, diethylene glycol monobutyl ether, diethylene glycol dimethyl ether, and diethylene glycol diethyl ether.

A combination of polyvinyl acetate and at least one member selected from the group consisting of Cellosolve, morpholine, N-ethylmorpholine, 1 methyl-2-pyrrolidone, furfuryl alcohol, tetrahydrofurfuryl alcohol, and N,N-dimethylacetamide.

When an organic polymer and an organic solvent are co-used, the same effects can be obtained in amounts of ⅔ or less compared with the case of using the organic polymer alone, or in amounts of ½ or less compared with the case of using the organic solvent alone.

These combinations are particularly preferable for preventing the generation of cracks on the gel.

In order to make the produced silica sol as uniform as possible, a system comprising a silicon alkoxide (I) and/or polycondensate thereof (II), water, one or more organic polymers belonging to the group (A) and one or more organic solvents belonging to the group (B) are well mixed using a stirrer or the like. It is also possible to expose the system to ultrasonic wave.

A catalyst is added to the system together with water. Considering the gelation time and easiness of sintering of the dried gel, the use of alkaline catalysts is more preferable than acidic catalysts. There is no particular limitation to the alcohol to be added together with water. Considering solubility for both the water and silicon alkoxide (I) and/or poly condensate thereof (II), it is preferable to use methanol, ethanol, 1-propyl alcohol, 2-propyl alcohol, or the like.

It is possible to use a general-purpose organic solvent such as acetone, ethyl acetate, or the like other than the alcohols so long as it has solubility for both water and silicon alkoxide (I) and/or polycondensate thereof (II).

As the alkyl group of silicon alkoxide (I) and polycondensate thereof (II), to have a methyl, ethyl, propyl or butyl group is more preferable considering easiness of the hydrolysis and the gelation time.

It is possible to add fine particles of silica to the system comprising a silicon alkoxide (I) and/or polycondensate thereof (II) and water for the hydrolysis in an amount of preferably 0.5 to 100 parts by weight per 100 parts by weight of the silicon alkoxide (I) and/or polycondensate thereof (II). It is preferable to previously disperse silica fine particles in a solvent or a mixed solution of a solvent and an silicon alkoxide (I) and/or polycondensate thereof (II) uniformly before the hydrolysis by adding water thereto. In such a case, the use of a surface active agent is effective in order to improve dispersing properties.

The produced silica sol solution is instantly transferred to another vessel for gelation. In order to prevent flying off of the solvent from the formed gel at the gelation step, it is preferable to seal the vessel. It is preferable to carry out the gelation at a temperature of 0° C. or higher.

In the drying step, a lid having many holes is used. A dried gel can be obtained by drying, shrinking and solidifying under a suitable atmosphere. Subsequently, the dried gel is sintered to give a silica glass.

The gelation step, the drying step and the sintering step can be carried out by conventional methods used in the production of silica glass by the sol-gel process. For example, the gelation step is carried out at 0° C. to 100° C. and standing still for several minutes to several days, the drying step is carried out at room temperature to 100° C. and standing still for several hours to several days, and the sintering step is carried out at a temperature rise rate of 10° to 200° C./hour to a temperature of 1000° to 1400° C. under a suitable atmosphere.

According to the present invention, by the addition of at least one organic polymer belonging to the group (A), at least one organic solvent belonging to the group (B), or a mixture thereof to the hydrolysis system, formation of silica fine particles in the sol can be controlled, binding of these silica fine particles in the gel is attained and relaxation of stress produced in the gel during the drying step is attained, so as to make it possible to produce a large-sized gel. Thus, it becomes possible to easily produce large-sized silica glasses without cracking by the sol-gel process. Further, there is fundamentally no limit to the size, and any shapes such as plates, rods and tubes can be produced freely.

In addition, since the silica glass can be produced less expensively according to the present invention compared with the prior art processes, it can be used not only in the field of photo mask substrates for IC production but also in the production of substrates for liquid crystal display devices.

This invention is illustrated by way of the following Examples, in which all parts and percents are by weight unless otherwise specified.

EXAMPLE 1

To a mixture of 50 parts of water, 110 parts of methanol and 0.06 part of choline, 5 parts of polyethylene glycol (molecular weight 50,000) was added and dissolved. The resulting solution was gradually added to 100 parts of silicon methoxide polycondensate (weight-average molecular weight 360 to 470) and sufficiently mixed to give a silica sol. The silica sol was placed in a laboratory dish having a diameter of 150 mm made from glass coated with polytetrafluoroethylene and sealed with an aluminum foil to carry out gelation at room temperature, followed by standing at room temperature for 5 days. Then, holes were perforated on a lid and drying was carried out in a constant temperature bath at 50° C for 2 weeks. Subsequently, the resulting gel was dried in a constant temperature bath at 120° C. for 1 day to give a dried gel having a diameter of about 110 mm. The resulting dried gel had a bulk density of about 0.7 g/cm$^3$ without cracks and fractures.

The resulting gel was sintered at 1300° C. in the air with heating at a temperature rise rate of 60° C./hr to give a transparent silica glass with a diameter of about 70 mm and a thickness of 5 mm without cracks and fractures. The analysis results were agreed to those of commercially available silica glass.

EXAMPLE 2

To a mixture of 110 parts of methanol, 50 parts of water and 0.06 part of choline, 2 parts of hydroxypropyl cellulose (a 2% aqueous solution having a viscosity of 400 cps at 20° C.) was added and dissolved. The resulting solution was gradually added to 100 parts of silicon methoxide polycondenstate (weight-average molecular weight 360 to 470) and mixed well to give a silica sol. The silica sol was placed in a laboratory dish having a diameter of 150 mm made from glass coated with polytetrafluoroethylene and sealed with an aluminum foil to carry out gelation at room temperature, followed by standing at room temperature for 5 days. Then, holes were perforated on a lid and drying was carried out in a constant temperature bath at 50° C. for 2 weeks. Subsequently, the resulting gel was dried in a constant temperature bath at 120° C. for 1 day to give a dried gel having a diameter of about 120 mm. The resulting dried gel had a bulk density of about 0.6 g/cm$^3$ without cracks and fractures.

The resulting gel was sintered at 1300° C in the air with heating at a temperature rise rate of 60° C./hr to give a transparent silica glass with a diameter of about 70 mm and a thickness of 5 mm without cracks and fractures. The analysis results were agreed to those of commercially available silica glass.

EXAMPLE 3

In 110 parts of ethanol, 10 parts of polyvinyl acetate (weight-average molecular weight 1400 to 1600) was sufficiently dissolved, followed by mixing with 50 parts of water and 0.06 part of choline. The resulting solution was gradually added to 100 parts of silicon methoxide [Si(OCH$_3$)$_4$] and mixed well to give a silica sol. The silica sol was placed in a laboratory dish having a diameter of 150 mm made from glass coated with polytetrafluoroethylene and sealed with an aluminum foil to carry out gelation at room temperature, followed by standing at room temperature for 5 days. Then, holes were perforated on a lid and drying was carried out in a constant temperature bath at 50° C. for 2 weeks. Subsequently, the resulting gel was dried in a constant temperature bath at 120° C. for 1 day to give a dried gel having a diameter of about 120 mm. The resulting dried gel had a bulk density of about 0.6 g/cm$^3$ without cracks and fractures.

The resulting gel was sintered at 1300° C. in the air with heating at a temperature rise rate of 60° C./hr to give a transparent silica glass with a diameter of about 70 mm and a thickness of 5 mm without cracks and fractures. The analysis results were agreed to those of commercially available silica glass.

EXAMPLE 4

To a uniform mixed solution of 155 parts of tetrahydrofurfuryl alcohol and 100 parts of tetramethoxysilane, an aqueous solution obtained by dissolving 0.06 part of choline in 50 parts of water was added and mixed well to give a silica sol. The silica sol was placed in a laboratory dish having a diameter of 200 mm made from glass coated with polytetrafluoroethylene to a depth of 10 mm and sealed with an aluminum foil to carry out gelation at room temperature, followed by standing at room temperature for 5 days. Then, holes were perforated on a lid and drying was carried out at 60° C. for 7 days, followed by drying at 120° C. for 1 day to give a dried gel having a diameter of about 160 mm. The resulting dried gel had a bulk density of 0.65 g/cm$^3$ without cracks and fractures.

The dried gel was heated at a temperature rise rate of 60° C./hour to 1250° C. in the air to give a silica glass having a diameter of about 100 mm without cracks and foams. The resulting silica glass was of high quality without having devitrification and bubbles. The analysis results were agreed to those of commercially available silica glass.

EXAMPLE 5

To a mixed solvent of 60 parts of methanol and 60 parts of butyl Cellosolve, 10 parts of fine particles of silica having a particle size of about 70 nm were added and dispersed uniformly. Then, 100 parts of silicon methoxide polycondensate (weight-average molecular weight 360 to 470) was mixed to form a uniform solution. Further, an aqueous solution obtained by dissolving 0.06 part of choline in 50 parts of water was added to the resulting solution and mixed well to give a silica sol. The silica sol was placed in a laboratory dish having a diameter of 200 mm made from glass coated with polytetrafluoroethylene to a depth of 10 mm and sealed with an aluminum foil to carry out gelation at room temperature for 5 days. Then, holes were perforated on a lid and drying was carried out at 60° C. for 7 days, followed by drying at 120° C. for 1 day to give a dried gel having a diameter of about 170 mm. The resulting dried gel had a bulk density of 0.65 g/cm$^3$ without cracks and fractures.

The resulting gel was heated at a temperature rise rate of 60° C./hour to 1250° C. in the air to give a silica glass having a diameter of about 110 mm without cracks and foams. The resulting silica glass was of high quality without having devitrification and bubbles. The analysis results were agreed to those of commercially available silica glass.

EXAMPLE 6

To a mixed solution of 40 parts of N,N-dimethylacetamide and 85 parts of methanol, 10 parts of polyvinyl acetate ($\overline{Mw}$ 1400–1600) was added and sufficiently dissolved, followed by sufficient mixing with 100 parts of tetramethoxysilane. To the resulting solution, a solution obtained by dissolving 0.06 part of choline in 50 parts of water was added gradually to give a silica sol. The silica sol was placed in a laboratory dish having a diameter of 200 mm made from glass coated with polytetrafluoroethylene to a depth of 10 mm and sealed with an aluminum foil to carry out gelation at room temperature, followed by standing at room temperature for 5 days. Then, holes were perforated on a lid and drying was carried out at 60° C. for 14 days, followed by drying at a temperature rise rate of 30° C./day to 170° C. to give a dried gel without cracks. The dry gel had a bulk density of 0.55 g/cm$^3$.

The dried gel was heated at a temperature rise rate of 60° C./hour to 1300° C. in the air to give a silica glass having no cracks and bubbles. The resulting silica glass was of high quality without having devitrification and bubbles. The analysis results were agreed to those of commercially available silica glass.

EXAMPLE 7

To a mixture of 50 parts of water and 0.06 part of choline, 90 parts of methanol, and 30 parts of diethylene glycol monomethyl ether, 2 parts of hydroxypropyl cellulose (viscosity of 2% aqueous solution 4000 cps (20° C.)) was added and dissolved. The resulting solution was gradually added to 100 parts of tetramethylsiloxane and mixed well to give a silica sol. The silica sol was placed in a laboratory dish having a diameter of 200 mm made from glass coated with polytetrafluoroethylene and sealed with an aluminum foil to carry out gelation at room temperature for 5 days. Then small holes were perforated on a lid and drying was carried out at 60° C. in a constant temperature bath for 2 weeks, followed by a temperature rise to 170° C. and maintained at that temperature for 1 day to give a dried gel. The dried gel had no cracks. The dry gel had a bulk density of 0.50 g/cm3.

The resulting dried gel was heated at a temperature rise rate of 60° C/hr to 1300° C and sintered in the air to give a transparent silica glass having no cracks.

What is claimed is:

1. A process for producing a silica glass which comprises
    hydrolyzing at least one member selected from the group consisting of a silicon alkoxide of the formula:

$$Si(OR)_4$$

wherein R is an alkyl group, and a silicon alkoxide polycondensate of the formula:

$$(RO)_3Si\cdot[OSi(OR)_2]_n\cdot OSi(OR)_3$$

wherein R is an alkyl group; and n is zero or an integer of 1 to 8, to give a silica sol,
    gelating the silica sol to give a silica gel,
    drying the silica gel to give a dry gel, and
    sintering the dry gel,
    at least before the gelation, there being added to a hydrolyzing system at least one member selected from the group (A) including polyethylene glycols, polyethylene glycol ethers, hydroxyalkyl celluloses, and polyvinyl acetates.

2. A process for producing a silica glass which comprises
    hydrolyzing at least one member selected from the group consisting of a silicon alkoxide of the formula:

$$Si(OR)_4$$

wherein R is an alkyl group, and a silicon alkoxide polycondensate of the formula:

$$(RO)_3Si\cdot[OSi(OR)_2]_n\cdot OSi(OR)_3$$

wherein R is an alkyl group; and n is zero or an integer of 1 to 8, to give a silica sol,
    gelating the silica sol to give a silica gel,
    drying the silica gel to give a dry gel, and
    sintering the dry gel,
    before the gelation, there being added to a hydrolyzing system at least one member of the group (B) including N,N-dimethylacetamide, 1-methyl-2-pyrrolidone, morpholine, N-ethylmorpholine, furfuryl alcohol, tetrahydrofurfuryl alcohol, Cellosolves, diacetone alcohol, ethylene glycol dimethyl ether, ethylene glycol diethyl ether, diethylene glycol monomethylether, diethylene glycol monoethyl ether, diethylene glycol monopropyl ether, diethylene glycol monobutyl ether, diethylene glycol dimethyl ether, and diethylene glycol diethyl ether.

3. A process for producing a silica glass which comprises
    hydrolyzing at least one member selected from the group consisting of a silicon alkoxide of the formula:

$$Si(OR)_4$$

wherein R is an alkyl group, and a silicon alkoxide polycondensate of the formula:

$$(RO)_3Si\cdot[OSi(OR)_2]_n\cdot OSi(OR)_3$$

wherein R is an alkyl group and n is zero or an integer of 1 to 8, to give a silica sol,
    gelating the silica sol to give a silica gel,
    drying the silica gel to give a dry gel, and
    sintering the dry gel,
    before the gelation, there being added to a hydrolyzing system at least one member selected from the group consisting of the group (A) consisting of polyethylene glycols, polyethylene glycol ethers, hydroxy alkyl celluloses, and polyvinyl acetates (said polyvinyl acetates being dissolved in an organic solvent), and the group (B) consisting of N,N-dimethylacetamide, 1-2-pyrrolidone, morpholine, N-ethyl morpholine, fufuryl alcohol, tetrahydrofurfuryl alochol, 2-ethoxyethanol, 2-methoxyethanol, 2-isopropoxyethanol, 2-butoxyethanol, diacetone alcohol, ethylene glycol dimethyl ether, ethylene glycol diethyl ether, diethylene glycol monomethyl ether, diethylene glycol monoethyl ether, diethylene glycol monopropyl ether, diethylene glycol monobutyl ether, diethylene glycol dimethyl ether and diethylene glycol diethyl ether.

4. A process according to claim 1, wherein the polyethylene glycol or the polyethylene glycol ether in group (A) has a molecular weight of 100 to 60,000.

5. A process according to claim 1, wherein the hydroxyalkyl cellulose employed as is a 2% aqueous solution having a viscosity of 100 to 10,000 cps measured at 20° C.

6. A process according to claim 1, wherein the polyvinyl acetate has a molecular weight of 100 to 250,000.

7. A process according to claim 2, which the compound selected from the group (B) is used in an amount of 3 to 200 parts by weight per 100 parts by weight of the silicon alkoxide and/or silicon alkoxide polycondensate used.

8. A process according to claim 3, wherein the compound of the group (A) is at least one of a polyethylene glycol and a polyethylene glycol ether and the compound of the group (B) is at least one member selected from the group consisting of N,N-dimethylacetamide, 2-ethoxyethanol, 2-methoxyethanol, 2-isopropoxyethanol, 2-butoxyethanol, ethylene glycol dimethyl ether, ethylene glycol diethyl ether, diethylene glycol monoethyl ether, diethylene glycol monoethyl ether, diethylene glycol monopropyl ether, diethylene glycol monobutyl ether, diethylene glycol dimethyl ether, diethylene glycol diethyl ether and tetrahydrofurfuryl alcohol.

9. A process according to claim 3, wherein the compound of the group (A) is a hydroxyalkyl cellulose and the compound of the group (B) is at least one member selected from the group consisting of morpholine, N-ethylmorpholine, 1-methyl-2-pyrrolidone, tetrahydrofurfuryl alcohol, N,N-dimethylacetamide, 2-ethoxyethanol, 2-methoxyethanol, 2-isopropoxyethanol, 2-butoxyethanol, ethylene glycol dimethyl ether, ethylene glycol diethyl ether, diethylene glycol monomethyl ether, diethylene glycol monoethyl ether, diethylene glycol monopropyl ether, diethylene glycol monobutyl ether, diethylene glycol dimethyl ether, and diethylene glycol diethyl ether.

10. A process according to claim 3, wherein the compound of the group (A) is polyvinyl acetate and the compound of the group (B) is at least one member selected from the group consisting of 2-ethoxyethanol, 2-methoxyethanol, 2; -iosopropoxyethanol, 2butoxyethanol, morpholine, N-ethylmorpholine, 1-methyl-2pyrrolidone, furfuryl alcohol, tetrahydrofurfuryl alcohol and N,N-dimethylacetamide.

11. A process according to claim 2, wherein a silica powder is added to the hydrolyzing system in an amount of 0.5 to 100 parts by weight per 100 parts by weight of at least one of the silicon alkoxide an of polycondensate thereof.

12. A process according to claim 2, wherein said Cellosolves comprise 2-ethyoxyethanol, 2-methoxyethanol, 2-isopropoxyethanol and 2-butoxyethanol.

13. A process according to claim 1, wherein the organic solvent solution of polyvinyl acetates is an ethanolic solution.

* * * * *